(12) United States Patent
Wessel (10) Patent No.: US 8,757,283 B2
(45) Date of Patent: Jun. 24, 2014

(54) AERATOR

(71) Applicant: Elmer A. Wessel, Lincoln, NE (US)

(72) Inventor: Elmer A. Wessel, Lincoln, NE (US)

( * ) Notice: Subject to any disclaimer, the term of this patent is extended or adjusted under 35 U.S.C. 154(b) by 0 days.

(21) Appl. No.: 13/841,173

(22) Filed: Mar. 15, 2013

(65) Prior Publication Data
US 2013/0248213 A1 Sep. 26, 2013

Related U.S. Application Data

(60) Provisional application No. 61/614,338, filed on Mar. 22, 2012.

(51) Int. Cl.
*A01B 45/02* (2006.01)

(52) U.S. Cl.
USPC ............................................. 172/22; 172/125

(58) Field of Classification Search
USPC ................................. 172/21, 22, 125
See application file for complete search history.

(56) References Cited

U.S. PATENT DOCUMENTS

| | | | |
|---|---|---|---|
| 2,056,337 A | 10/1936 | Archibald | |
| 2,206,264 A * | 7/1940 | Rose | 172/21 |
| 2,302,944 A * | 11/1942 | Helbig | 172/21 |
| 3,136,274 A * | 6/1964 | Townsend | 111/118 |
| 3,802,513 A | 4/1974 | Ploenges | |
| 3,834,464 A | 9/1974 | Carlson | |
| 3,878,899 A | 4/1975 | Jones | |
| 3,913,682 A * | 10/1975 | Kaercher et al. | 172/20 |
| 4,569,400 A | 2/1986 | Minagawa | |
| 4,577,697 A | 3/1986 | Moak | |
| 4,658,909 A * | 4/1987 | McDermott et al. | 172/22 |
| 4,753,298 A * | 6/1988 | Hansen et al. | 172/22 |
| 4,926,947 A * | 5/1990 | Cozine et al. | 172/22 |
| 5,570,746 A | 11/1996 | Jones | |
| 5,810,092 A | 9/1998 | Selvatici | |
| 6,273,197 B1 | 8/2001 | Marlow | |
| 6,892,821 B2 | 5/2005 | Wessel | |
| 7,730,960 B1 | 6/2010 | Knight | |
| 2002/0189825 A1 * | 12/2002 | Livingstone | 172/21 |
| 2011/0005783 A1 * | 1/2011 | Livingstone | 172/1 |

* cited by examiner

*Primary Examiner* — Jamie L McGowan
(74) *Attorney, Agent, or Firm* — Geoffrey Dobbin; Dobbin IP Law P.C.

(57) ABSTRACT

The aerator features a rotatable tine assembly so as to avoid obstacles or aid in the extrication of the aerator therefrom. The tine assembly includes a plurality of tines mounted about a crank shaft and projecting through said retractor plate. Each tine rod passes between two rollers, one serving as a fulcrum is mounted directly on the retractor plate while the other is mounted upon a spring arm that biases the tine rod as far as possible into a forward position. The aerator is driven by the tines used to puncture the ground.

7 Claims, 7 Drawing Sheets

AERATOR

CROSS-REFERENCES TO RELATED APPLICATIONS

This application claims priority as a non-provisional perfection of prior filed U.S. Provisional Application No. 61/614,338, filed Mar. 23, 2012, and incorporates the same by reference in its entirety herein.

FIELD OF THE INVENTION

The present invention relates to the field of earth working and more particularly relates to an aerator.

BACKGROUND OF THE INVENTION

The advent of agriculture required early farmers to work the land to their benefit, rather than gather as previously had been done. Early man developed many tools with which to work the soil and provide advantageous conditions for crop development. Over time, many tools have been developed for various purposes. On such purpose is the delivery of water, nutrients and air to the root system of the plant. This is particularly true in modern lawns, where grasses may form a thatch if merely left on the ground after being cut and ground becomes compacted over time. For this purpose, the modern aerator was developed. Aerators began with hand or foot tools that pierced holes in the thatch and ground and have since become mechanized and utilize a plurality of tines to progressively pierce thatch and soil.

Modern aerators, for the most part, have similar concerns. First, holes need to be made with as little disturbance of the surrounding soil as possible. Accordingly, piercings by the tines must be made cleanly and tines must also be extracted cleanly. Second, piercings are ideally made at a depth determined by the operator of the machine. So, depth should be variable. Also, modern lawns in particular present obstacles that must be avoided or, if not avoided, must be worked around by the aerator. This can be particularly difficult to do and to also maintain integrity of surrounding soil as some tines are usually embedded within the soil at times when the aerator needs to be sharply moved to avoid an obstacle.

The present invention is an aerator featuring a tine assembly that is rotatable about an axis parallel to the surface of the ground being treated. As such, tines are easily retracted from the ground if a blocking obstacle is encountered. Also, the rotation of the tine assembly allows for greater flexibility when moving across uneven ground. The aerator also features a biasing system that keeps tines in their most advantageous position in the cycle of piercing and withdrawing from the soil, despite the tilt of the tine assembly.

The present invention represents a departure from the prior art in that the aerator of the present invention allows for a tilting tine assembly to be used in avoiding obstacles, extricating the aerator from obstacles and proceeding over uneven ground surface. Additional features maintain the tines in an advantageous forward position up impact with the ground for use in these objectives.

SUMMARY OF THE INVENTION

In view of the foregoing disadvantages inherent in the known types of aerators, this aerator provides a tilting tine assembly. As such, the present invention's general purpose is to provide a new and improved aerator that is maneuverable around obstacles, is easily removed from obstacles when encountered and travels easily over uneven ground.

To accomplish these objectives, the aerator comprises a rotatable tine assembly mounted to the frame of the aerator. A retractor plate is coupled to the tine assembly, but is independently removable therefrom. The tine assembly includes a plurality of tines mounted about a crank shaft and projecting through said retractor plate. Each tine rod passes between two rollers, one serving as a fulcrum is mounted directly on the retractor plate while the other is mounted upon a spring arm that biases the tine rod as far as possible into a forward position.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, the preferred embodiment of the aerator is herein described. It should be noted that the articles "a", "an", and "the", as used in this specification, include plural referents unless the content clearly dictates otherwise.

Figure 1:
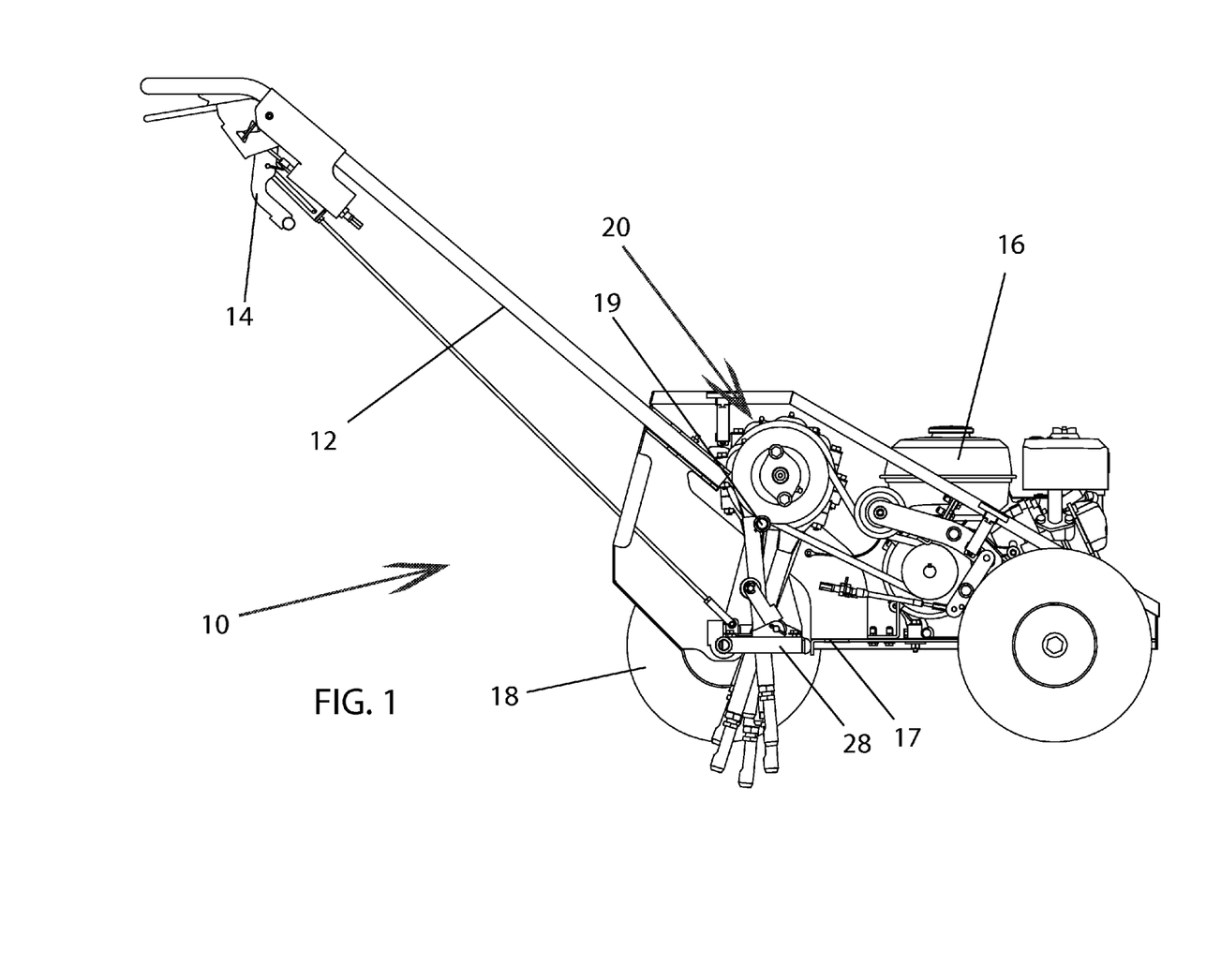
FIG. 1 is a side elevation of an aerator manufactured according to the teaching of the present invention.
Figure 7:
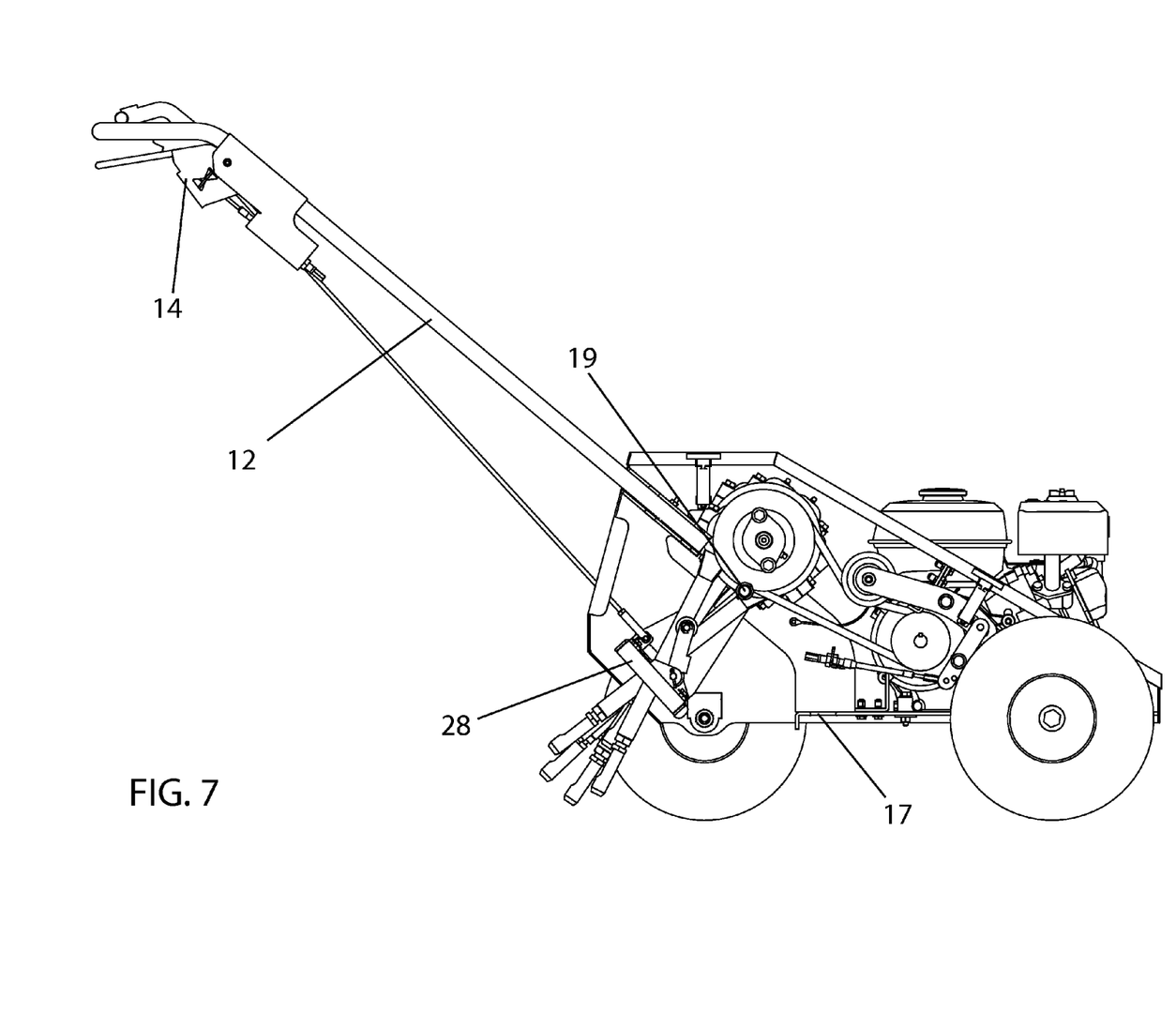
FIG. 7 is a side elevation of the aerator of FIG. 1, with the tine assembly tilted away from the ground.

With reference to FIG. 1, an aerator 10 comprises motor 16 mounted upon a chassis with wheels 18. A handle 12 extends from the chassis and provides a mount for controls 14. Also mounted upon chassis, is tine assembly 20, which is operably connected to motor 16 by at least one belt. Retractor plate 28 is operably connected to the controls 14 and can be pulled by activating the controls 14, thereby rotating the entire tine assembly out of a position of engagement with the ground, should the need to do so arise (FIG. 7). The entire tine assembly 20 rotates about mounting point 19. In operation, the retractor plate 28 is positioned downward and located properly by abutting stop 17.

Figure 2:
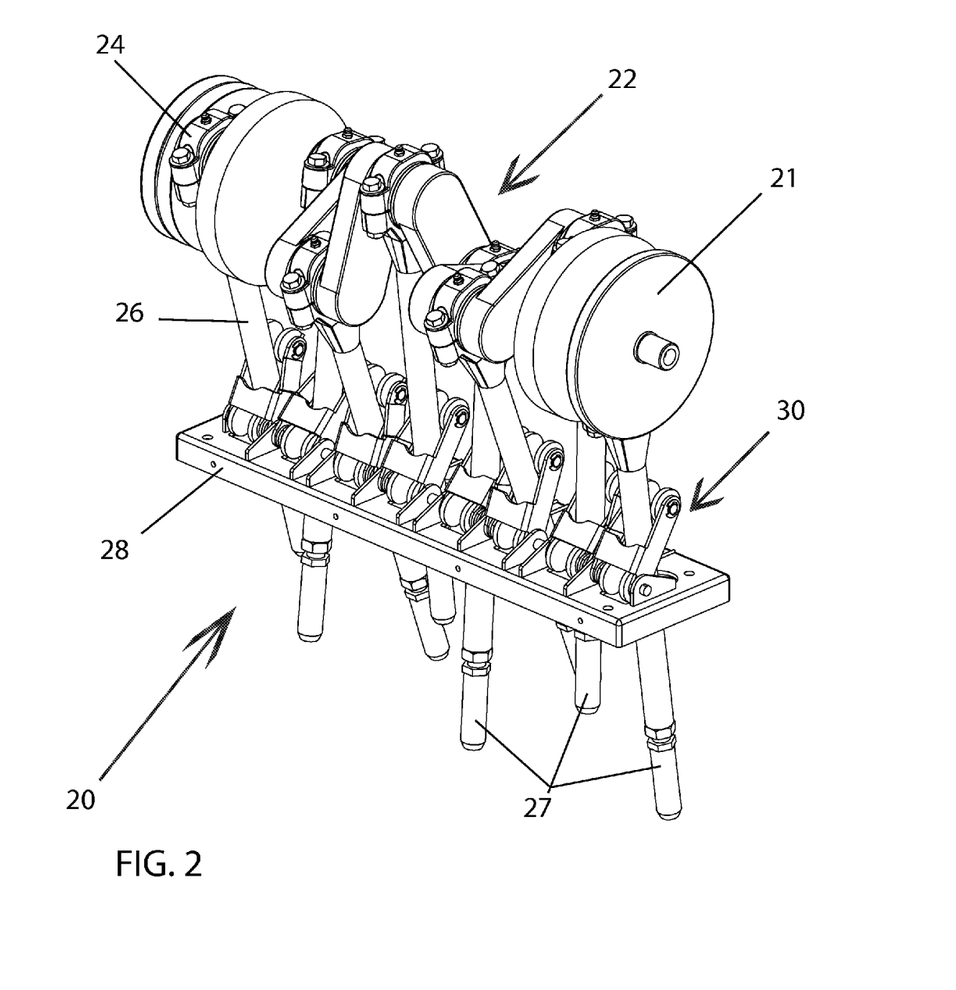
FIG. 2 is a perspective view of the tine assembly of FIG. 1.
Figure 3:
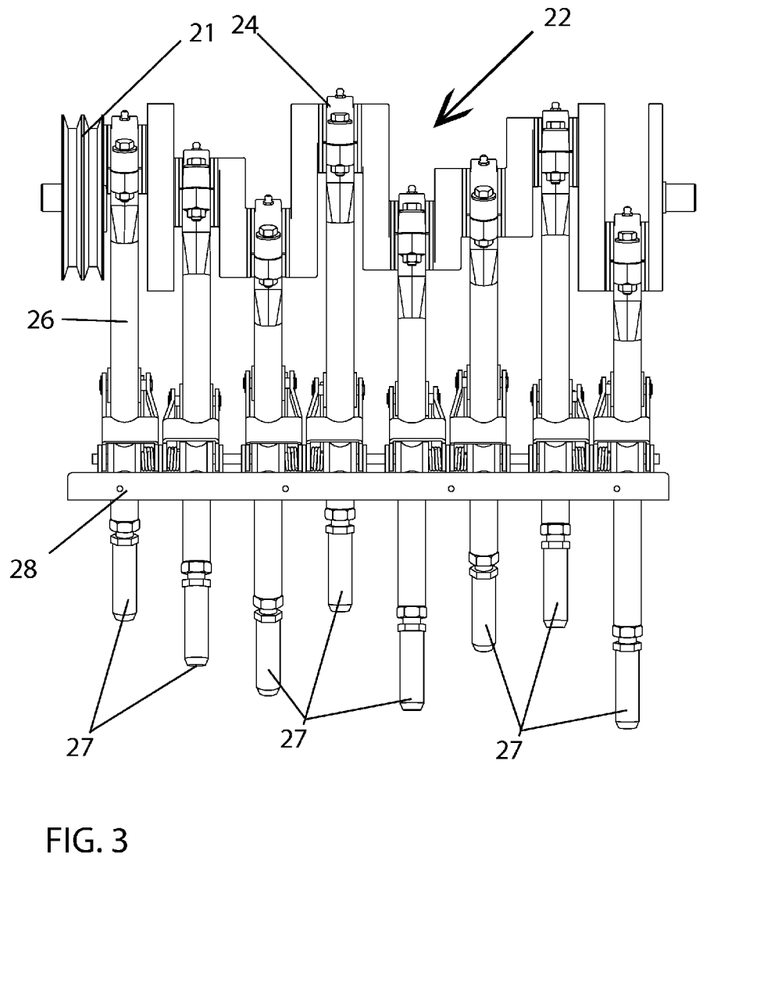
FIG. 3 is a front plan view of the tine assembly of FIG. 2.

FIGS. 2 and 3 depict the tine assembly in greater detail. Pulley 21 is operably connected to the belt of the motor 16 (FIG. 1) and a rotating crank shaft 22. At various locations about the crank shaft 22, tine rods 26 are connected at heads 24. The relative angle between each tine rod will be dependent upon the number of tines in the system. Ideally, tine rods 26 should be evenly spaced about the crank shaft, but not in sequential order. So, for an eight tine system, as depicted in the Figures, a tine rod 26 should be positioned every 45° about the crank shaft 22. Heads 24 should be rotatable about the crank shaft 22 in order to keep the tine rods 26 pointing generally downwards. Ideally, crank shaft 22 should position the tine rods 26 so that two adjacent tine rods 26, and associated tines 27, are not impinging ground right after the other. This staggering of the tines 27 allows for better control of moments caused by the rotation of the crank shaft.

Figure 4:
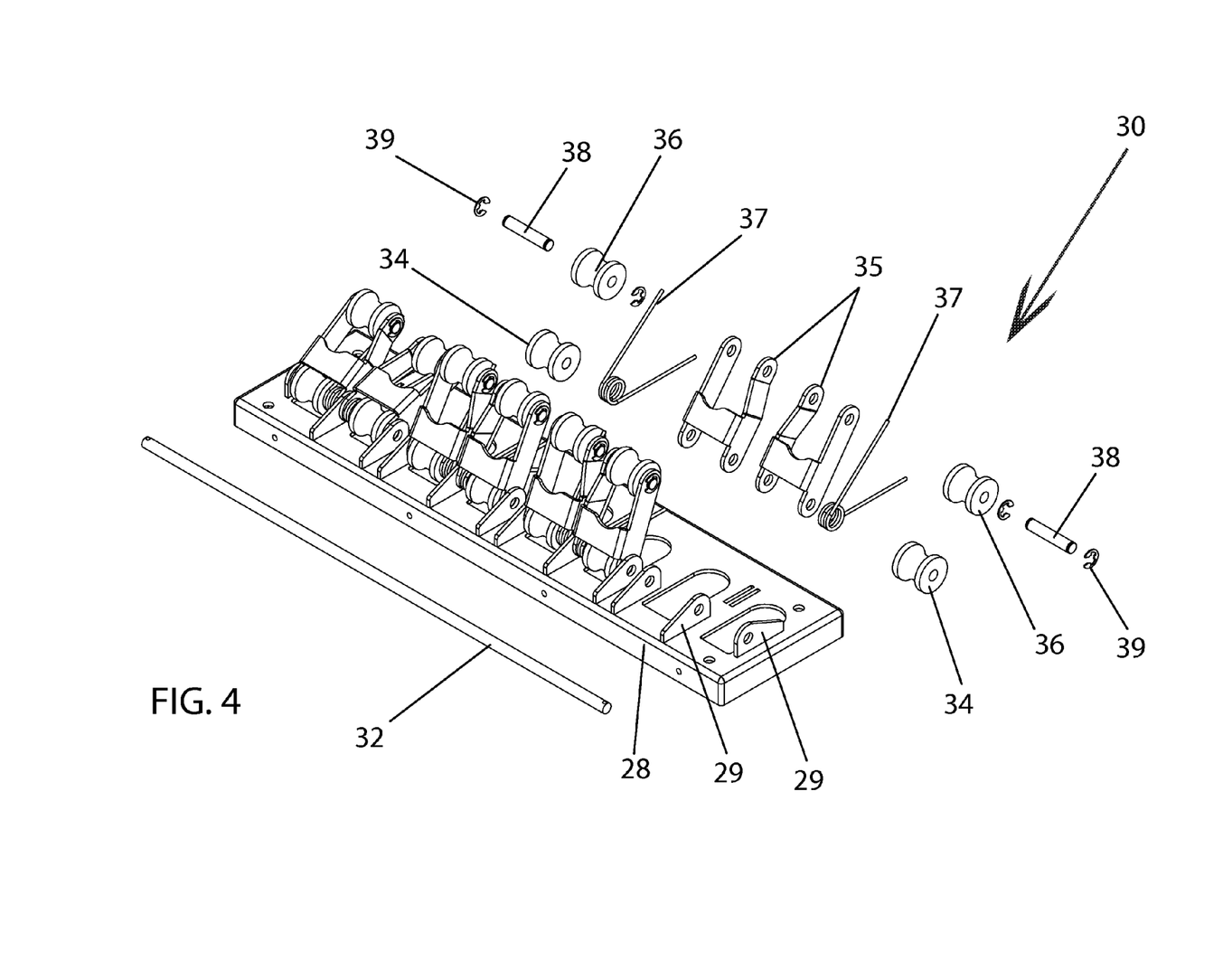
FIG. 4 is an exploded view of the retractor plate assembly of FIG. 2.

Tine rods 26 extend through holes in retractor plate 28 and pass through a biasing system 30, shown in better detail in FIG. 4. Retractor plate 28 features a number of upwards extending tabs 29 about the holes through which the tine rods 26 pass. Each tine rod 26 has a spring arm 35 and a fulcrum roller 34. The spring arm 35 is essentially a frame with two opposing bars connected with a cross beam and each bar has two holes located at either end. The spring arms 35 and fulcrum rollers 34 are mounted on the tabs 29 by means of a retaining rod 32 that passes through coaxial holes in the tabs 29, the lower set of holes in the spring arms 35, torsion springs 37, and fulcrum rollers 34. Each spring arm 35 is biased by a torsion spring 37 into an upwards orientation and, at its extreme upper end, a bias roller 36 is mounted about an axle 38 passes through the upper holes in the spring arm 35 and is secured by clips 39 about the frame of the spring arm 35. As seen in FIGS. 2 and 3, tine rod 26 is inserted between the crossbar of the spring arm 35 and the bias roller 36 such that the bias roller is behind the tine rod. Spring arm 35 then biases the tine rod 26 against the fulcrum roller 34; however, because of the give in the spring, it also allows the tine rod 26 to move backwards, away from the fulcrum roller 34, as force is placed on the tine rod 26 through the cycle of motion of the tine assembly 20. It should be noted that, in the preferred embodiment, both bias roller 36 and fulcrum roller 34 are grooved to lessen unwanted side-to-side movement of the tine rod 26.

Figure 5A:
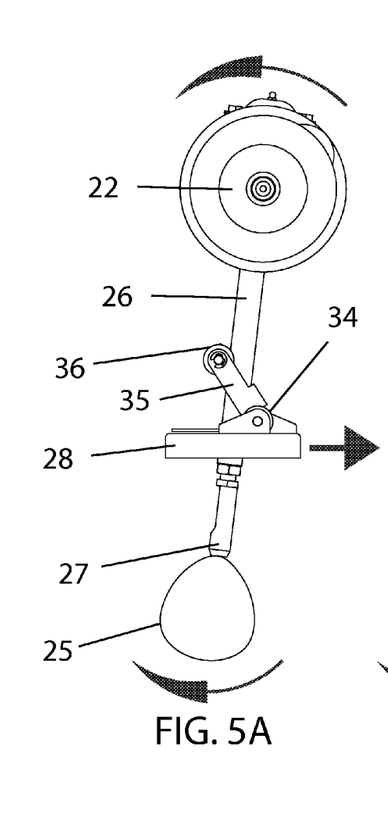
FIGS. 5A-5D are side elevations of the tine assembly of FIG. 2, depicting one tine and the relative motions of the tine, crank shaft and aerator.
Figure 5B:
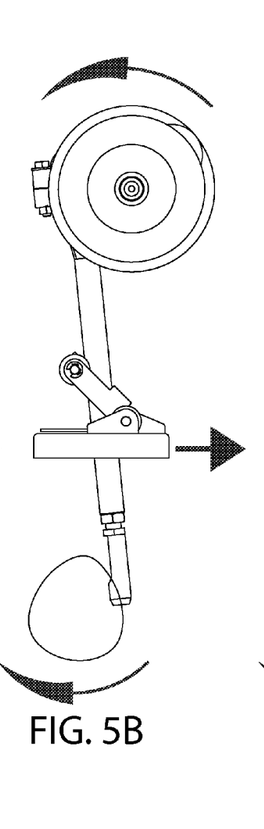
Figure 5C:
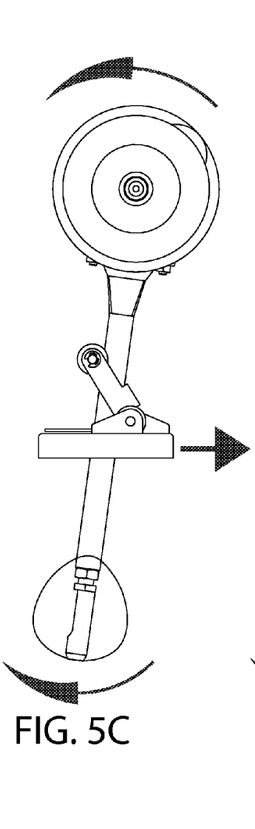
Figure 5D:
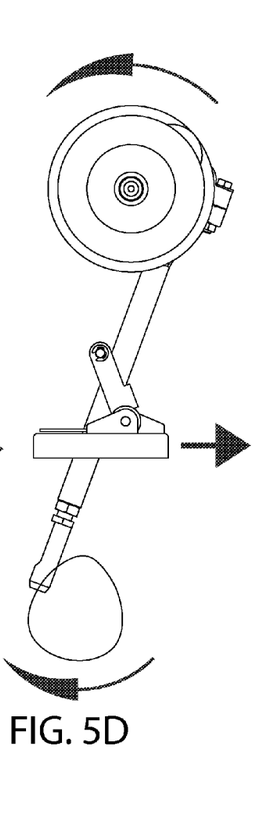

Motion of the assembly is depicted in FIGS. 5A-5D. As a tine 27 begins its travel, it begins in at an apex position. As crank shaft 22 rotates in a direction opposite the travel of the aerator, it pushes tine rod 26 and the associated tine downwards. Spring arm 35 forces the tine rod 26 forward (FIG. 5B). As crank shaft 22 continues, tine 27 reaches the bottom of its path of travel 25 (FIG. 5C) and is eventually retracted from the ground (FIG. 5D). The path of travel 25 is ovoid. This path of travel lessens the disturbance of the ground around the piercing and works the tine 27 out of the ground in a smoother action. The path of travel 25 is opposite the rotation of the crank shaft 22. This motion 25 by the tines 27 actually provides the propulsion of the preferred aerator.

Figure 6A:
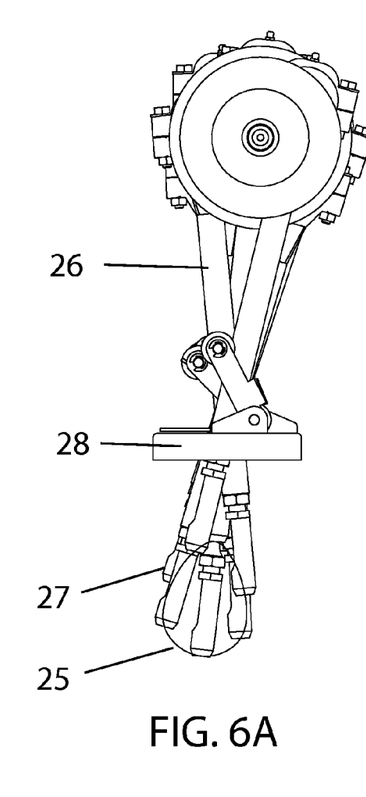
FIGS. 6A-6C are side elevations of the tine assembly of FIG. 2, depicting various adjustments of the retractor plate relative to the tine assembly.
Figure 6B:
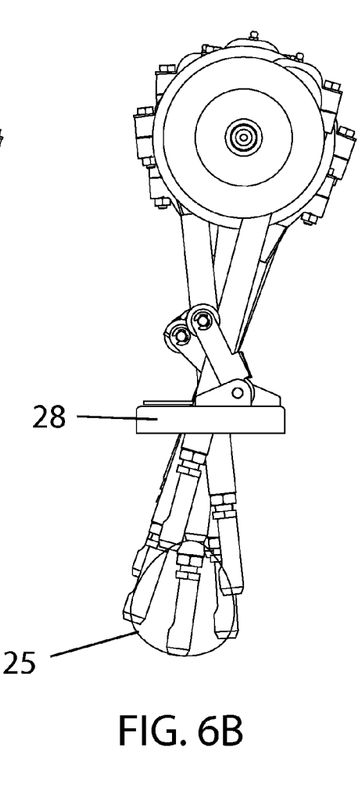
Figure 6C:
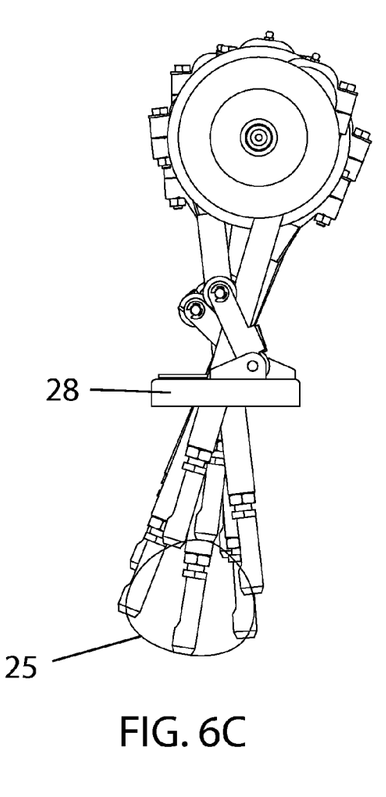

FIGS. 6A-6C depict adjustment of the tines' path of travel 25 by adjustment of the retractor plate 28. It should be noted in FIG. 6A, the retractor plate 28 is in the lowest position and the resultant path of travel 25 is still ovoid, but narrower than that of the middle placement depicted in FIG. 6B. FIG. 6C depicts the retractor plate 28 in the highest position, resulting in a wide path of travel 25. This adjustment changes the speed at which the aerator travels, with higher retractor plate 28 settings resulting in higher speeds. It is significant to note that the change in speed is not derived from any change in the performance of the motor 16. As such, the motor 16 need only run at a single speed. Since the tines 27 provide the motive force of the aerator 10, it is necessary to provide a method of extraction should the tines become stuck. Certain impediments to the tines 27, such as sprinkler heads, are avoided when the rotation of the tines 17 stops when one strikes an impediment. Then forward momentum of the aerator 10 moves the aerator past the impediment and, when the tine 17 is no longer blocked by the impediment, the tine 17 may then rotate again. Should this method fail, the tines 27 may always be extracted by rotating the retractor plate 28, and entire tine assembly, out of the ground (FIG. 7). This action would not only extract the tines, but also stop the forward motion of the aerator.

It should be noted that the retractor plate 28 is removable from the tine assembly 20 without disturbing the assembly proper.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. An aerator comprising:
   a. a crank shaft;
   b. a plurality of tines pivotably attached to the crank shaft in operable order, each tine further comprising a tine rod;
   c. a retractor plate, further comprising a plurality of parallel slots;
   d. a plurality of spring arms, each one pivotably mounted at a pivot point in front of each of the plurality of slots and biased in an upward orientation each spring arm further comprising;
      i. a frame;
      ii. a fulcrum roller mounted within one end of the frame and located about the pivot point; and
      iii. a bias roller mounted within an end of the frame opposite the fulcrum roller;
   e. each tine rod passing through one spring arm, between the fulcrum roller and bias roller such that the bias roller is behind the tine rod, and likewise each tine rod passing through a slot on the retractor plate;
   wherein the spring arm constantly urges the tine rod forward, above and toward the fulcrum roller.

2. The aerator of claim 1, each tine being positioned about the crankshaft such that no two adjacent tines are in contact with ground at the same time.

3. The aerator of claim 1, the tines being equidistantly positioned about the crank shaft.

4. The aerator of claim 1, only the tines providing force to move the aerator forward as each tine successively contacts and embeds in ground.

5. The aerator of claim 4, the retractor plate being operatively connected to a height control mechanism such that the retractor plate may be raised and lowered with respect to the aerator, thereby adjusting speed of the aerator.

6. The aerator of claim 1, the retractor plate being operatively connected to a height control mechanism such that the retractor plate may be raised and lowered with respect to the aerator.

7. The aerator of claim 1, the retractor plate pivotably mounted such that it may be rotated in a manner to pull all of the tines away from contact with ground.

* * * * *